US 6,552,625 B2

(12) United States Patent
Bowling

(10) Patent No.: US 6,552,625 B2
(45) Date of Patent: Apr. 22, 2003

(54) PROCESSOR WITH PULSE WIDTH MODULATION GENERATOR WITH FAULT INPUT PRIORITIZATION

(75) Inventor: Stephen A. Bowling, Chandler, AZ (US)

(73) Assignee: Microchip Technology Inc., Chandler, AZ (US)

( * ) Notice: Subject to any disclaimer, the term of this patent is extended or adjusted under 35 U.S.C. 154(b) by 0 days.

(21) Appl. No.: 09/870,650

(22) Filed: Jun. 1, 2001

(65) Prior Publication Data

US 2002/0180545 A1 Dec. 5, 2002

(51) Int. Cl.$^7$ .............................................. H03K 07/08
(52) U.S. Cl. ..................... 332/109; 327/172; 327/175
(58) Field of Search ......................... 332/109; 327/175, 327/172

(56) References Cited

U.S. PATENT DOCUMENTS

| | | | |
|---|---|---|---|
| 3,781,810 A | 12/1973 | Downing | 712/228 |
| 4,398,244 A | 8/1983 | Chu et al. | 364/200 |
| 4,472,788 A | 9/1984 | Yamazaki | 364/900 |
| 4,481,576 A | 11/1984 | Bicknell | 364/200 |
| 4,488,252 A | 12/1984 | Vassar | 364/748 |
| 4,511,990 A | 4/1985 | Hagiwara et al. | 364/748 |
| 4,556,938 A | 12/1985 | Parker et al. | 364/200 |
| 4,626,988 A | 12/1986 | George | 364/200 |
| 4,730,248 A | 3/1988 | Watanabe et al. | 364/200 |
| 4,782,457 A | 11/1988 | Cline | 364/715.04 |
| 4,807,172 A | 2/1989 | Nukiyama | 364/715.08 |
| 4,829,420 A | 5/1989 | Stahle | 364/200 |
| 4,829,460 A | 5/1989 | Ito | 364/715.08 |
| 4,839,846 A | 6/1989 | Hirose et al. | 364/748 |
| 4,872,128 A | 10/1989 | Shimizu | 364/715.08 |
| 4,882,701 A | 11/1989 | Ishii | 364/900 |
| 4,941,120 A | 7/1990 | Brown et al. | 364/748 |
| 4,943,940 A | 7/1990 | New | 364/748 |
| 4,959,776 A | 9/1990 | Deerfield et al. | 364/200 |
| 4,977,533 A | 12/1990 | Miyabayashi et al. | 364/725 |

(List continued on next page.)

Primary Examiner—Robert Pascal
Assistant Examiner—Kimberly E Glenn
(74) Attorney, Agent, or Firm—Swidler Berlin Shereff Friedman, LLP

(57) ABSTRACT

A processor that has pulse width modulation generation circuitry that provides an improved capability to deal with fault conditions, and particularly with multiple concurrent fault conditions, occurring in external circuitry and devices that are connected to PWM hardware included in a processor. A pulse width modulation generator for a processor includes fault priority circuitry having a plurality of fault inputs operable to receive fault input signals and a fault output operable to output a fault output signal, the fault priority circuitry operable to receive fault input signals on a plurality of fault inputs concurrently, and output a fault output signal corresponding to a fault input having a highest priority among the fault inputs that are receiving fault input signals, and pulse width modulation circuitry having at least one pulse width modulation output operable to output at least one pulse width modulated signal and a fault input operable to receive the fault output signal from the fault priority circuitry, the pulse width modulation circuitry operable to drive the pulse width modulation output to a defined state associated with the selected fault input.

16 Claims, 3 Drawing Sheets

U.S. PATENT DOCUMENTS

| | | | |
|---|---|---|---|
| 4,984,213 A | 1/1991 | Abdoo et al. | 365/230.3 |
| 5,007,020 A | 4/1991 | Inskeep | 364/900 |
| 5,012,441 A | 4/1991 | Retter | 364/942.7 |
| 5,032,986 A | 7/1991 | Pathak et al. | 364/200 |
| 5,038,310 A | 8/1991 | Akagiri et al. | 364/715.04 |
| 5,056,004 A | 10/1991 | Ohde et al. | 264/200 |
| 5,099,445 A | 3/1992 | Studor et al. | 364/715.08 |
| 5,101,484 A | 3/1992 | Kohn | 395/375 |
| 5,117,498 A | 5/1992 | Miller et al. | 395/775 |
| 5,122,981 A | 6/1992 | Taniguchi | 364/748 |
| 5,155,823 A | 10/1992 | Tsue | 395/400 |
| 5,197,023 A | 3/1993 | Nakayama | 708/55 |
| 5,197,140 A | 3/1993 | Balmer | 395/400 |
| 5,206,940 A | 4/1993 | Murakami et al. | 395/400 |
| 5,212,662 A | 5/1993 | Cocanougher et al. | 364/948 |
| 5,276,634 A | 1/1994 | Suzuki et al. | 364/748 |
| 5,282,153 A | 1/1994 | Bartkowiak et al. | 364/716 |
| 5,327,543 A | 7/1994 | Miura et al. | 395/375 |
| 5,327,566 A | 7/1994 | Forsyth | 395/775 |
| 5,379,240 A | 1/1995 | Byrne | 364/715.08 |
| 5,448,703 A | 9/1995 | Amini et al. | 395/290 |
| 5,448,706 A | 9/1995 | Fleming et al. | 395/421.07 |
| 5,463,749 A | 10/1995 | Wertheizer et al. | 395/437 |
| 5,469,377 A | 11/1995 | Amano | 364/748 |
| 5,471,600 A | 11/1995 | Nakamoto | 395/405 |
| 5,497,340 A | 3/1996 | Uramoto et al. | 364/745 |
| 5,499,380 A | 3/1996 | Iwata et al. | 395/800 |
| 5,548,544 A | 8/1996 | Matheny et al. | 364/745 |
| 5,568,412 A | 10/1996 | Han et al. | 364/748 |
| 5,596,760 A | 1/1997 | Ueda | 395/588 |
| 5,600,813 A | 2/1997 | Nakagawa et al. | 395/421.07 |
| 5,619,711 A | 4/1997 | Anderson | 395/800 |
| 5,642,516 A | 6/1997 | Hedayat et al. | 395/733 |
| 5,689,693 A | 11/1997 | White | 395/565 |
| 5,694,350 A | 12/1997 | Wolrich et al. | 364/788 |
| 5,696,711 A | 12/1997 | Makineni | 364/748.03 |
| 5,706,460 A | 1/1998 | Craig et al. | 395/380 |
| 5,715,470 A | 2/1998 | Asano et al. | 395/800 |
| 5,737,570 A | 4/1998 | Koch | 395/476 |
| 5,740,419 A | 4/1998 | Potter | 395/588 |
| 5,748,516 A | 5/1998 | Goddard et al. | 364/748.03 |
| 5,764,555 A | 6/1998 | McPherson et al. | 364/748.03 |
| 5,774,711 A | 6/1998 | Henry et al. | 395/591 |
| 5,778,416 A | 7/1998 | Harrison et al. | 711/5 |
| 5,790,443 A | 8/1998 | Shen et al. | 304/746 |
| 5,808,926 A | 9/1998 | Gorshtein et al. | 364/748.11 |
| 5,812,439 A | 9/1998 | Hansen | 364/748.03 |
| 5,825,730 A | 10/1998 | Nishida et al. | 369/44.32 |
| 5,826,096 A | 10/1998 | Baxter | 395/800.24 |
| 5,828,875 A | 10/1998 | Halvarsson et al. | 395/588 |
| 5,862,065 A | 1/1999 | Muthusamy | 364/736.5 |
| 5,880,984 A | 3/1999 | Burchfiel et al. | 364/748.07 |
| 5,892,697 A | 4/1999 | Brakefield | 364/748.02 |
| 5,892,699 A | 4/1999 | Duncan et al. | 364/760.01 |
| 5,894,428 A | 4/1999 | Harada | 364/724.03 |
| 5,900,683 A * | 5/1999 | Rinehart et al. | 307/126 |
| 5,909,385 A | 6/1999 | Nishiyama et al. | 364/760.03 |
| 5,917,741 A | 6/1999 | Ng | 364/748.03 |
| 5,930,159 A | 7/1999 | Wong | 364/745.01 |
| 5,930,503 A | 7/1999 | Drees | 713/1 |
| 5,938,759 A | 8/1999 | Kamijo | 712/209 |
| 5,941,940 A | 8/1999 | Prasad et al. | 708/523 |
| 5,943,249 A | 8/1999 | Handlogten | 364/748.2 |
| 5,951,627 A | 9/1999 | Kiamilev et al. | 708/404 |
| 5,951,679 A | 9/1999 | Anderson et al. | 712/241 |
| 5,991,787 A | 11/1999 | Abel et al. | 708/400 |
| 5,996,067 A | 11/1999 | White | 712/224 |
| 6,009,454 A | 12/1999 | Dummermuth | 709/108 |
| 6,014,723 A | 1/2000 | Tremblay et al. | 711/1 |
| 6,026,489 A | 2/2000 | Wachi et al. | 712/241 |
| 6,044,392 A | 3/2000 | Anderson et al. | 708/551 |
| 6,044,434 A | 3/2000 | Oliver | 711/110 |
| 6,058,409 A | 5/2000 | Kozaki et al. | 708/409 |
| 6,058,410 A | 5/2000 | Sharangpani | 708/551 |
| 6,058,464 A | 5/2000 | Taylor | 711/217 |
| 6,061,780 A | 5/2000 | Shippey et al. | 712/204 |
| 6,076,154 A | 6/2000 | Van Eijndhoven et al. | 712/24 |
| 6,101,521 A | 8/2000 | Kosiec | 708/550 |
| 6,115,732 A | 9/2000 | Oberman et al. | 708/625 |
| 6,128,728 A | 10/2000 | Dowling | 712/228 |
| 6,134,574 A | 10/2000 | Oberman et al. | 708/551 |
| 6,145,049 A | 11/2000 | Wong | 710/207 |

\* cited by examiner

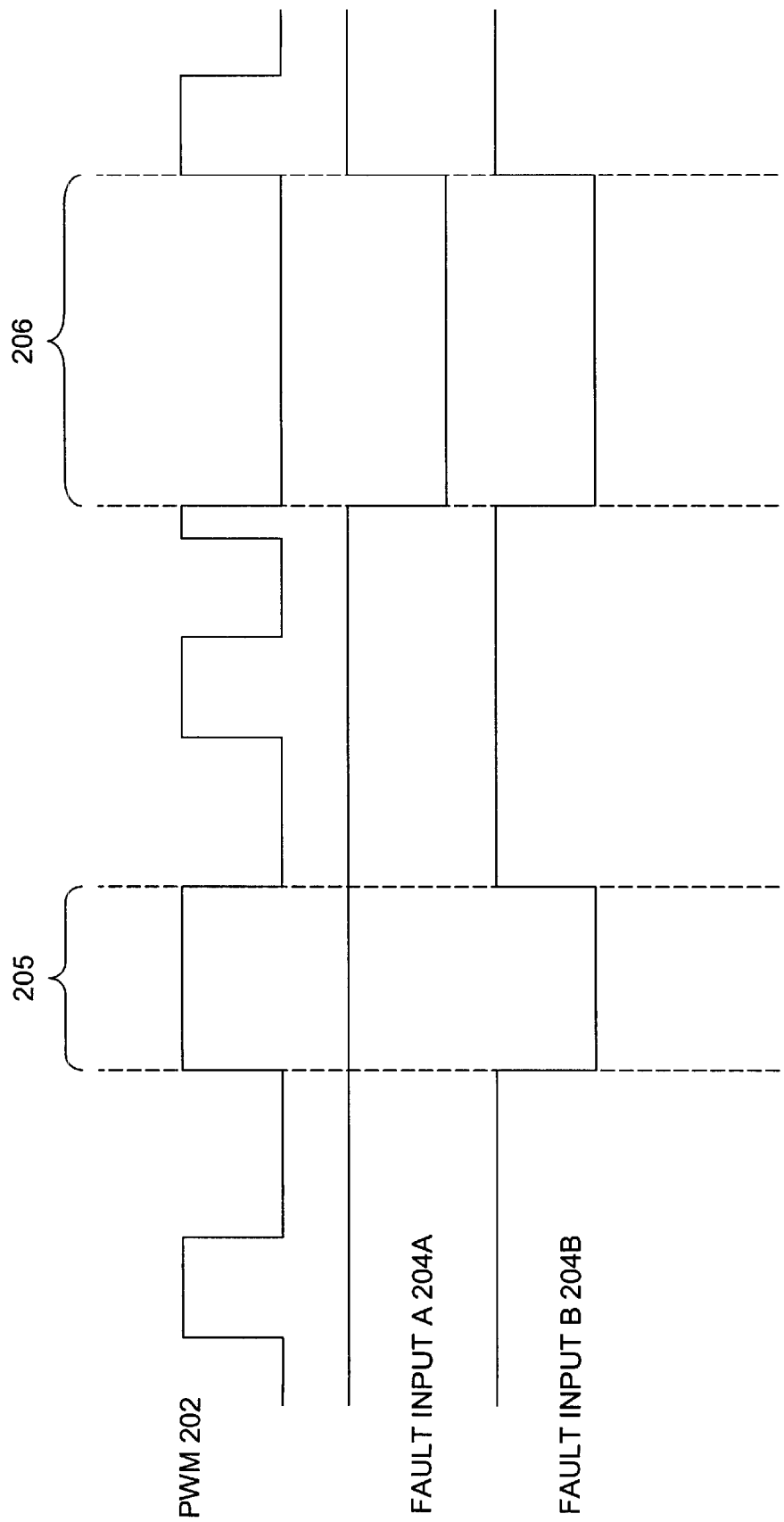

PROCESSOR WITH PULSE WIDTH MODULATION GENERATOR WITH FAULT INPUT PRIORITIZATION

FIELD OF THE INVENTION

The present invention relates to a processor having a pulse width modulation (PWM) generator that has multiple fault inputs that force the PWM output signals to defined states and priority logic that outputs a fault response associated with a highest priority fault inputs, in the case of multiple concurrent faults.

BACKGROUND OF THE INVENTION

Processors, including microprocessors, digital signal processors and microcontrollers, operate by running software programs that are embodied in one or more series of program instructions stored in a memory. The processors run the software by fetching the program instructions from the series of program instructions, decoding the program instructions and executing them. In addition to program instructions, data is also stored in memory that is accessible by the processor. Generally, the program instructions process data by accessing data in memory, modifying the data and storing the modified data into memory.

Processors may be programmed to perform a wide variety of functions in software. In some cases, however, dedicated hardware may be included in a processor that significantly eases the processing load needed to perform certain functions. This allows the use of lower performance processor for these functions, which lowers the cost of the processor. One type of dedicated hardware that may advantageously be included in a processor is power control hardware. Power control hardware provides the capability to control circuitry and devices that use significant amounts of power. For example, power control hardware may be used to control motors, power supplies, etc.

One common mode of operation of power control hardware is pulse width modulation (PWM). In PWM, the power level is controlled by controlling the duty cycle of a signal that has only two states—active and inactive. The signal is then integrated in a device, such as a motor or a capacitor, to yield the equivalent of a continuously varying voltage and current.

One problem that arises when PWM hardware is included in a processor is handling fault conditions that may occur in the external, controlled circuitry. Examples of faults that may occur include failure of an external switching device, such as a transistor, short circuit of external circuitry or devices, such as a motor, overcurrent detected in external circuitry, a fault in the power supply, etc. Typically, fault conditions must be dealt with quickly, in order to avoid catastrophic failures. An additional problem arises when more than one fault conditions occurs concurrently. Problems arise with conventional PWM hardware, which has been included in current processors, in dealing with fault conditions, and particularly in dealing with multiple concurrent fault conditions.

A need arises for a technique that provides an improved ability to deal with fault conditions, and particularly with multiple concurrent fault conditions, occurring in external circuitry and devices that are connected to PWM hardware included in a processor.

SUMMARY OF THE INVENTION

The present invention is a processor that has pulse width modulation generation circuitry that provides an improved capability to deal with fault conditions, and particularly with multiple concurrent fault conditions, occurring in external circuitry and devices that are connected to PWM hardware included in a processor. This is accomplished by providing multiple fault inputs that force the PWM output signals to defined states and priority logic that outputs a fault response associated with a highest priority fault inputs, in the case of multiple concurrent faults.

According to one embodiment of the present invention, a pulse width modulation generator for a processor includes fault priority circuitry having a plurality of fault inputs operable to receive fault input signals and a fault output operable to output a fault output signal, the fault priority circuitry operable to receive fault input signals on a plurality of fault inputs concurrently, and output a fault output signal corresponding to a fault input having a highest priority among the fault inputs that are receiving fault input signals, and pulse width modulation circuitry having at least one pulse width modulation output operable to output at least one pulse width modulated signal and a fault input operable to receive the fault output signal from the fault priority circuitry, the pulse width modulation circuitry operable to drive the pulse width modulation output to a defined state associated with the selected fault input.

In one aspect of the present invention, each fault input has an associated defined state to which the pulse width modulation output will be driven. Values defining the states of the pulse width modulation outputs may be stored in at least one register modifiable by software.

In one embodiment of the present invention, a processor includes pulse width modulation generation circuitry including fault priority circuitry having a plurality of fault inputs operable to receive fault input signals and a fault output operable to output a fault output signal, the fault priority circuitry operable to receive fault input signals on a plurality of fault inputs concurrently, and output a fault output signal corresponding to a fault input having a highest priority among the fault inputs that are receiving fault input signals, and pulse width modulation circuitry having at least one pulse width modulation output operable to output at least one pulse width modulated signal and a fault input operable to receive the fault output signal from the fault priority circuitry, the pulse width modulation circuitry operable to drive the pulse width modulation output to a defined state associated with the selected fault input.

In one aspect of the present invention, each fault input has an associated defined state to which the pulse width modulation output will be driven. Values defining the states of the pulse width modulation outputs may be stored in at least one register modifiable by software.

BRIEF DESCRIPTION OF THE FIGURES

FIG. 3 depicts exemplary signals illustrating the operations of the fault inputs and priority logic shown in FIG. 2.

DETAILED DESCRIPTION

Figure 1:
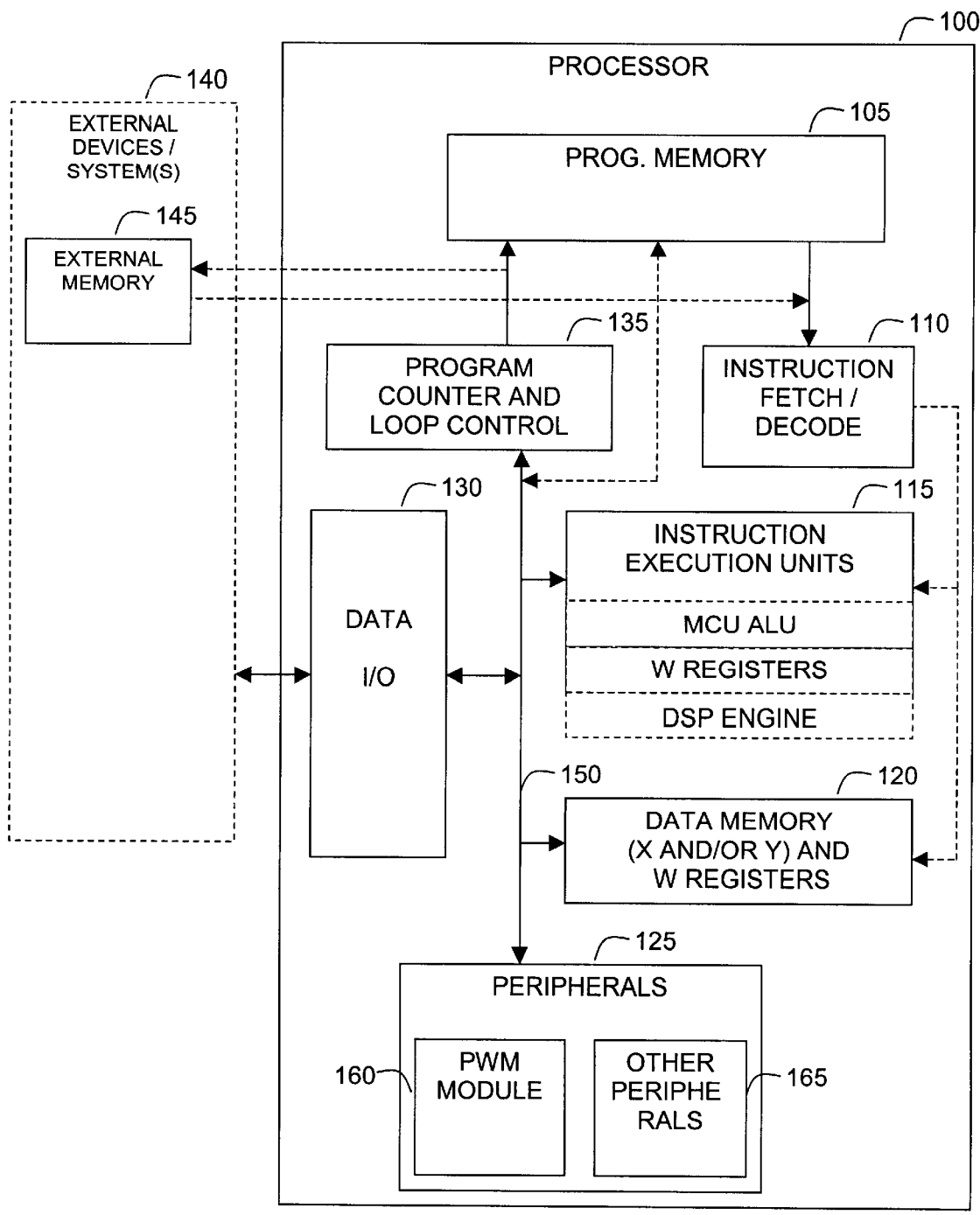
FIG. 1 depicts a functional block diagram of an embodiment of a processor chip within which the present invention may find application.

FIG. 1 depicts a functional block diagram of an embodiment of a processor chip within which the present invention may find application. Referring to FIG. 1, a processor 100 is coupled to external devices/systems 140. The processor 100 may be any type of processor including, for example, a digital signal processor (DSP), a microprocessor, a microcontroller, or combinations thereof. The external devices 140 may be any type of systems or devices including input/output devices such as keyboards, displays, speakers, microphones, memory, or other systems which may or may not include processors. Moreover, the processor 100 and the external devices 140 may together comprise a stand alone system.

The processor 100 includes a program memory 105, an instruction fetch/decode unit 110, instruction execution units 115, data memory and registers 120, peripherals 125, data I/O 130, and a program counter and loop control unit 135. The bus 150, which may include one or more common buses, communicates data between the units as shown.

The program memory 105 stores software embodied in program instructions for execution by the processor 100. The program memory 105 may comprise any type of nonvolatile memory such as a read only memory (ROM), a programmable read only memory (PROM), an electrically programmable or an electrically programmable and erasable read only memory (EPROM or EEPROM) or flash memory. In addition, the program memory 105 may be supplemented with external nonvolatile memory 145 as shown to increase the complexity of software available to the processor 100. Alternatively, the program memory may be volatile memory, which receives program instructions from, for example, an external non-volatile memory 145. When the program memory 105 is nonvolatile memory, the program memory may be programmed at the time of manufacturing the processor 100 or prior to or during implementation of the processor 100 within a system. In the latter scenario, the processor 100 may be programmed through a process called in circuit serial programming.

The instruction fetch/decode unit 110 is coupled to the program memory 105, the instruction execution units 115, and the data memory 120. Coupled to the program memory 105 and the bus 150 is the program counter and loop control unit 135. The instruction fetch/decode unit 110 fetches the instructions from the program memory 105 specified by the address value contained in the program counter 135. The instruction fetch/decode unit 110 then decodes the fetched instructions and sends the decoded instructions to the appropriate execution unit 115. The instruction fetch/decode unit 110 may also send operand information including addresses of data to the data memory 120 and to functional elements that access the registers.

The program counter and loop control unit 135 includes a program counter register (not shown) which stores an address of the next instruction to be fetched. During normal instruction processing, the program counter register may be incremented to cause sequential instructions to be fetched. Alternatively, the program counter value may be altered by loading a new value into it via the bus 150. The new value may be derived based on decoding and executing a flow control instruction such as, for example, a branch instruction. In addition, the loop control portion of the program counter and loop control unit 135 may be used to provide repeat instruction processing and repeat loop control as further described below.

The instruction execution units 115 receive the decoded instructions from the instruction fetch/decode unit 110 and thereafter execute the decoded instructions. As part of this process, the execution units may retrieve one or two operands via the bus 150 and store the result into a register or memory location within the data memory 120. The execution units may include an arithmetic logic unit (ALU) such as those typically found in a microcontroller. The execution units may also include a digital signal processing engine, a floating point processor, an integer processor, or any other convenient execution unit.

The data memory and registers 120 are volatile memory and are used to store data used and generated by the execution units. The data memory 120 and program memory 105 are preferably separate memories for storing data and program instructions respectively. This format is a known generally as a Harvard architecture. It is noted, however, that according to the present invention, the architecture may be a Von-Neuman architecture or a modified Harvard architecture, which permits the use of some program space for data space. A dotted line is shown, for example, connecting the program memory 105 to the bus 150. This path may include logic for aligning data reads from program space such as, for example, during table reads from program space to data memory 120.

A plurality of peripherals 125 on the processor may be coupled to the bus 125. The peripherals may include pulse width modulation (PWM) module 160 and other peripherals 165, such as analog to digital converters, timers, bus interfaces and protocols such as, for example, the controller area network (CAN) protocol or the Universal Serial Bus (USB) protocol and other peripherals. The peripherals exchange data over the bus 150 with the other units. The PWM module 160 is capable of generating multiple, synchronized pulse width modulated (PWM) outputs. The PWM module 160 may be advantageously applied to a variety of power and motion control applications, such as control of Three-Phase AC Induction Motors, Switched Reluctance (SR) Motors, Brushless DC (BLDC) Motors, and Uninterruptable Power Supplies (UPSs).

The data I/O unit 130 may include transceivers and other logic for interfacing with the external devices/systems 140. The data I/O unit 130 may further include functionality to permit in circuit serial programming of the Program memory through the data I/O unit 130.

Figure 2:
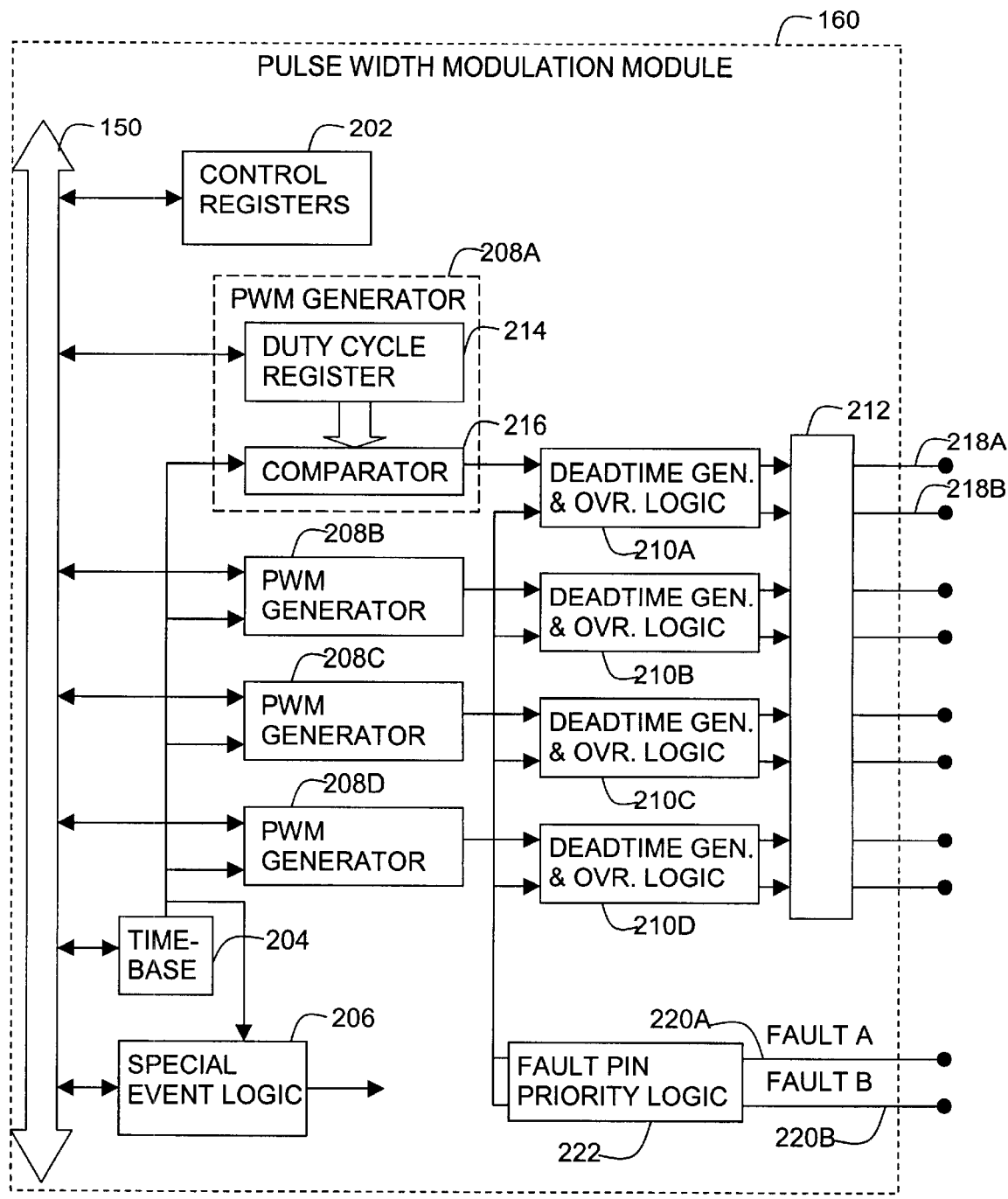
FIG. 2 depicts a functional block diagram of a pulse width modulation (PWM) module for use in a processor, such as that shown in FIG. 1.

FIG. 2 depicts a functional block diagram of a pulse width modulation (PWM) module 160, for use in a processor 100, such as that shown in FIG. 1. PWM module 160 includes control registers 202, timebase 204, special event logic 206, at least one pulse width modulation generator, such as PWM generators 208A, 208B, 208C, and 208D, for each PWM generator, a deadtime generator, such as deadtime generators 210A, 210B, 210C, and 210D, and output driver circuitry 212. Bus 150 is communicates data among units of processor 100 and elements of PWM module 160. In particular, bus 150 communicates data with control registers 202, timebase 204, special event logic 206, and the at least one PWM generator, such as PWM generators 208A, 208B, 208C, and 208D.

Control registers 202 store values that are modifiable in software and provide the capability to control and configure the operation of the elements of PWM module 160. Control registers 202 may include a plurality of control registers, each control register including a plurality of bits. Each control register may be read, under software control, to determine the configuration and operational state of elements of PWM module 160. Likewise, each control register may be written, under software control, to set the configuration and control the operation of element of PWM module 160. For example, bits in control registers 202 may provide the capability to enable or disable the generation of PWM signals by PWM module 160. Bits in control register 202 may provide the capability to set the polarity and timing of signals output by PWM module 160, such as the frequency, duty cycle, and dead time of such signals. Bits in control registers 202 may provide the capability to enable, disable, and configure special event triggering, fault triggering, override operation, and other functions of PWM module 160.

Timebase 204 generates timing signals that are used by other elements of PWM module 160, such as special event logic 206 and the PWM generators 206A–D. Timebase 204 may include registers, counters, comparators, and other circuitry that operate with a timing clock signal to provide the capability to generate timing signals having programmable parameters. For example, timebase 204 may provide the capability to program parameters such as: the count direction of included counters, the resolution and prescaling of the timing clock used to generate the timebase signals, the mode of operation of timebase interrupts, postscaling of timebase signals, and the mode of operations of the timebase, such as continuous, free running, single shot, etc.

Special event logic 206 generates trigger signals that provide the capability to synchronize operations external to PWM module 160 with the operation of PWM module 160. For example, in an embodiment of processor 100 in which other peripherals 165 includes one or more analog to digital (A/D) converters, the operation of such A/D converters may be synchronized to the operation of PWM module 160 using the trigger signals generated by special event logic 206. Special event logic 206 uses signals generated by timebase 204 to generate trigger signals that are synchronized with selected points in the period of the PWM signals generated by PWM module 160.

Each PWM generator generates a PWM signal, which is input to a deadtime generator. Each PWM generator, such as PWM generator 208A, may include a duty cycle register, such as duty cycle register 214, a comparator, such as comparator 216, and associated circuitry. Duty cycle register 214 stores a value that controls the duty cycle of the PWM signals. The duty cycle of a PWM signal is the fraction of each complete PWM cycle that the signal is in the active state. Duty cycle register 214 typically includes a buffer register, which is accessible by software, and a comparison register, which stores the actual compare value used in each PWM cycle. The value in the comparison register is compared by comparator 216, to a value generated by timebase 204. The status of this comparison controls the signals output from comparator 216, which, in turn, control whether the PWM signal is in the active or inactive state.

The output from each comparator, such as comparator 216, is input to a deadtime generator, such as deadtime generator 210A. Deadtime generator 210A may pass the signal from comparator 216 without alteration, or deadtime generator 210A may alter the signal. One such alteration that deadtime generator 210A may make is to generate a set of complementary PWM signals based on the signal from comparator 216. Complementary signals are signals that are arranged so that when one signal is active, the other signal is inactive. When the active signal becomes inactive, the inactive signal becomes active, and so on. Deadtime generator 210 also inserts deadtime into the complementary signals. Deadtime is a period during which neither complementary signal is active.

The complementary PWM signals generated by each deadtime generator, such as deadtime generator 210A, is input to output driver circuitry 212, which includes circuitry of sufficient capacity to drive circuitry external to processor 100. The drive signals are supplied to external circuitry via processor pins, such as pins 218A and 218B.

Fault inputs 220A and 220B provide the capability to drive one or more of the PWM outputs to a defined state. Such a function is useful if a fault occurs in the external circuitry that is controlled by the PWM outputs of processor 100. The function of the fault inputs is performed directly in hardware, so that fault events can be managed quickly. Examples of faults that may occur include failure of an external switching device, such as a transistor, short circuit of external circuitry or devices, such as a motor, overcurrent detected in external circuitry or devices, a fault in the power supply, etc. Fault pin priority logic 222 provides the capability to prioritize the function of the fault inputs if more than one input becomes active. The signals output from fault pin priority logic 222 are input to the deadtime generators 210A–210D. The deadtime generators also include fault override logic that overrides the function of the deadtime generator in response to a fault signal from fault pin priority logic 222, if so configured.

Included in control registers 202 are registers that control the configuration and function of PWM module 160 in response to activation of one or more fault inputs. In particular, the registers provide the capability to define whether a particular pair of PWM outputs associated with a deadtime generator, such as PWM outputs 218A and 218B and deadtime generator 210A, are controlled by the fault inputs. If enabled, the override logic in the deadtime generator will respond to a fault output signal 224 from fault pin priority logic 222 and perform a defined action.

Control registers 202 store values that define the state of each PWM output in response to a fault signal input to each fault input. Each PWM output can be defined to be driven inactive or active in response to the fault signal input to each fault input. For example, PWM output 218A may be defined to be driven inactive in response to a fault signal on fault input 220A and may be defined to be driven active in response to a fault signal on fault input 220B. If a PWM output pair associated with one deadtime generator is in the complementary output mode and both PWM outputs are defined to be driven to the active state in response to a fault signal input to a fault input, both PWM outputs would be driven active, which is not desirable. In this situation, the override logic in the deadtime generator will give priority to one PWM output, drive that PWM output active, and drive the other PWM output inactive.

Fault pin priority logic 222 provides prioritization among the fault inputs. If more than one fault input has been defined to control a particular PWM output and at least two such fault inputs become active concurrently, fault pin priority logic 222 selects a highest priority one of the fault inputs. The PWM outputs are driven to the fault states defined for the highest priority fault input, and the other fault inputs are ignored. Fault priority logic 222 generates a fault output signal 224 that indicates the highest priority fault input. Fault output signal 224 in input to the deadtime generators, such as deadtime generator 210A, which drives its associated PWM outputs to the fault state defined for the highest priority fault input.

Each of the fault inputs has two modes of operation:

Latched Mode: When the fault input is driven active, the PWM outputs will remain in the defined fault states until the fault input is driven inactive and the fault condition is cleared in software. The PWM outputs will be enabled for normal, non-fault operation once the fault condition is cleared in software.

Cycle-by-Cycle Mode: When the fault input is driven active, the PWM outputs will remain in the defined fault states until the fault input is driven inactive. When the fault input is driven inactive, the PWM outputs will return to normal, no-fault operation at the beginning of the next PWM period.

The mode of operation of each fault input is defined in registers included in control registers 202.

Each fault input may also be controlled directly by software. Processor 100 can be configured so that software can directly drive the active or inactive levels of each fault input.

The operation of the fault inputs and priority logic is illustrated in FIG. 3, in which exemplary signals are illustrated. PWM output signal 202 is an exemplary PWM signal having nominal 50% duty cycle. Fault input A signal 204A and fault input B signal 204B are exemplary signals input to fault input A and fault input B, respectively. When both fault input A signal 204A and fault input B signal 204B are inactive, exemplified as high in FIG. 3, PWM output signal 202 operates normally. When fault input B signal 204B alone becomes active, exemplified as low in FIG. 3, PWM output signal 202 is driven to a defined state, exemplified as high during period 205 in FIG. 3. When fault input B signal 204B returns to inactive, PWM output signal 202 returns to normal operation. When both fault input A signal 204A and fault input B signal 204B become active, the priority logic selects the highest priority fault input to be given priority. In the example shown in FIG. 3, fault input A has priority over fault input B. Therefore, PWM output 202 are driven to the fault state defined for fault input A, which has been given priority, and fault input B is ignored. In FIG. 3, the defined fault state for fault input A is exemplified as low, so PWM output signal 202 is driven low during period 206, until the fault input signals become inactive.

While specific embodiments of the present invention have been illustrated and described, it will be understood by those having ordinary skill in the art that changes may be made to those embodiments without departing from the spirit and scope of the invention.

What is claimed is:

1. A pulse width modulation generator for a processor comprising:

fault priority circuitry having a plurality of fault inputs operable to receive fault input signals and a fault output operable to output a fault output signal, the fault priority circuitry operable to receive fault input signals on at least two of the plurality of fault inputs concurrently, and output a fault output signal corresponding to a fault input having a highest priority among the fault inputs that are receiving fault input signals; and pulse width modulation circuitry having at least one pulse width modulation output operable to output at least one pulse width modulated signal and a fault input operable to receive the fault output signal from the fault priority circuitry, the pulse width modulation circuitry operable to drive the pulse width modulation output to a defined state associated with the selected fault input.

2. A pulse width modulation generator of claim 1, wherein each fault input has an associated defined state to which the pulse width modulation output will be driven.

3. A pulse width modulation generator of claim 2, wherein values defining the states of the pulse width modulation outputs are stored in at least one register modifiable by software.

4. A processor comprising:

pulse width modulation generation circuitry comprising:

fault priority circuitry having a plurality of fault inputs operable to receive fault input signals and a fault output operable to output a fault output signal, the fault priority circuitry operable to receive fault input signals on at least two of the plurality of fault inputs concurrently, and output a fault output signal corresponding to a fault input having a highest priority among the fault inputs that are receiving fault input signals; and pulse width modulation circuitry having at least one pulse width modulation output operable to output at least one pulse width modulated signal and a fault input operable to receive the fault output signal from the fault priority circuitry, the pulse width modulation circuitry operable to drive the pulse width modulation output to a defined state associated with the selected fault input.

5. The processor of claim 4, wherein each fault input has an associated defined state to which the pulse width modulation output will be driven.

6. The processor of claim 5, wherein values defining the states of the pulse width modulation outputs are stored in at least one register modifiable by software.

7. A pulse width modulation generator for a processor comprising:

fault priority circuitry included in the processor having a plurality of fault inputs operable to receive fault input signals and a fault output operable to output a fault output signal, the fault priority circuitry operable to receive fault input signals on at least two of the plurality of fault inputs concurrently, and output a fault output signal corresponding to a fault input having a highest priority among the fault inputs that are receiving fault input signals; and pulse width modulation circuitry included in the processor having at least one pulse width modulation output operable to output at least one pulse width modulated signal and a fault input operable to receive the fault output signal from the fault priority circuitry, the pulse width modulation circuitry operable to drive the pulse width modulation output to a defined state associated with the selected fault input.

8. A pulse width modulation generator of claim 7, wherein each fault input has an associated defined state to which the pulse width modulation output will be driven.

9. A pulse width modulation generator of claim 8, wherein values defining the states of the pulse width modulation outputs are stored in at least one register modifiable by software.

10. A processor comprising:

pulse width modulation generation circuitry included in the processor comprising:

fault priority circuitry having a plurality of fault inputs operable to receive fault input signals and a fault output operable to output a fault output signal, the fault priority circuitry operable to receive fault input signals on at least two of the plurality of fault inputs concurrently, and output a fault output signal corresponding to a fault input having a highest priority among the fault inputs that are receiving fault input signals; and pulse width modulation circuitry having at least one pulse width modulation output operable to output at least one pulse width modulated signal and a fault input operable to receive the fault output signal from the fault priority circuitry, the pulse width modulation circuitry operable to drive the pulse width modulation output to a defined state associated with the selected fault input.

11. The processor of claim 10, wherein each fault input has an associated defined state to which the pulse width modulation output will be driven.

12. The processor of claim 11, wherein values defining the states of the pulse width modulation outputs are stored in at least one register modifiable by software.

13. A pulse width modulation generator for a processor comprising:

fault priority circuitry having a plurality of fault inputs operable to receive fault input signals and a fault output operable to output a fault output signal, the fault priority circuitry operable to receive fault input signals on at least two of the plurality of fault inputs concurrently, and output a fault output signal corresponding to a fault input having a highest priority among the fault inputs that are receiving fault input signals; and pulse width modulation circuitry having at least one pulse width modulation output operable to output at least one pulse width modulated signal and a fault input operable to receive the fault output signal from the fault priority circuitry, the pulse width modulation circuitry operable to drive the pulse width modulation output to a defined state associated with the selected fault input and wherein each fault input has an associated defined state to which the pulse width modulation output will be driven.

14. A pulse width modulation generator of claim 13, wherein values defining the states of the pulse width modulation outputs are stored in at least one register modifiable by software.

15. A processor comprising:

pulse width modulation generation circuitry comprising:

fault priority circuitry having a plurality of fault inputs operable to receive fault input signals and a fault output operable to output a fault output signal, the fault priority circuitry operable to receive fault input signals on at least two of the plurality of fault inputs concurrently, and output a fault output signal corresponding to a fault input having a highest priority among the fault inputs that are receiving fault input signals; and pulse width modulation circuitry having at least one pulse width modulation output operable to output at least one pulse width modulated signal and a fault input operable to receive the fault output signal from the fault priority circuitry, the pulse width modulation circuitry operable to drive the pulse width modulation output to a defined state associated with the selected fault input and wherein each fault input has an associated defined state to which the pulse width modulation output will be driven.

16. The processor of claim 15, wherein values defining the states of the pulse width modulation outputs are stored in at least one register modifiable by software.

* * * * *